United States Patent [19]

Cheng et al.

[11] Patent Number: 5,881,232
[45] Date of Patent: Mar. 9, 1999

[54] GENERIC SQL QUERY AGENT

[75] Inventors: Josephine M. Cheng; HongHai Shen; Steven John Watts, all of San Jose, Calif.

[73] Assignee: International Business Machines Corporation, Armonk, N.Y.

[21] Appl. No.: 684,012

[22] Filed: Jul. 23, 1996

[51] Int. Cl.⁶ .................................................. G06F 15/16
[52] U.S. Cl. ........................... 395/200.47; 395/200.59; 395/200.49; 707/10
[58] Field of Search ....................... 395/200.31, 200.32, 395/200.33, 200.49, 200.47, 200.59; 707/10, 2–5, 104

[56] References Cited

U.S. PATENT DOCUMENTS

| | | | |
|---|---|---|---|
| 4,422,145 | 12/1983 | Sacco et al. | 364/300 |
| 4,714,992 | 12/1987 | Gladney et al. | 364/200 |
| 4,714,996 | 12/1987 | Gladney et al. | 364/300 |
| 4,751,635 | 6/1988 | Kret | 364/200 |
| 4,774,655 | 9/1988 | Kollin et al. | 364/200 |
| 5,317,727 | 5/1994 | Tsuchida et al. | 395/600 |
| 5,454,105 | 9/1995 | Hatakeyama | 395/600 |
| 5,542,046 | 7/1996 | Carlson et al. | 395/186 |
| 5,627,979 | 5/1997 | Chang et al. | 395/613 |
| 5,689,697 | 11/1997 | Edwards et al. | 395/603 |
| 5,701,451 | 12/1997 | Rogers et al. | 395/600 |
| 5,742,905 | 4/1998 | Pepe et al. | 455/461 |
| 5,774,461 | 6/1998 | Hyden et al. | 370/329 |

*Primary Examiner*—Mehmet B. Geckil
*Attorney, Agent, or Firm*—Merchant, Gould, Smith, Edell, Welter, & Schmidt

[57] ABSTRACT

A method, apparatus, and article of manufacture for providing access to information stored in a database management system. The method and apparatus uses an intelligent generic query agent to operate with a wide variety of remote users, and to allow implementation of a wide variety of optimization schemes. The method comprises receiving a request from the remote user at the agent, transforming the request into database management system commands optimized in accordance with user-specified optimization criteria, transmitting the database management system commands to the database management system, receiving the database management system command result from the database management system in the agent, transforming the database management system command result into a response message, and transmitting the response message to from the agent to the remote user.

63 Claims, 8 Drawing Sheets

GENERIC SQL QUERY AGENT

BACKGROUND OF THE INVENTION

1. Field of the Invention

The present invention relates generally to methods for accessing information stored in a database management system (DBMS), and in particular, to a generic query agent for providing optimized remote user access to database management systems.

2. Description of the Related Art

Large-scale integrated database management systems provide an efficient, consistent, and secure means for storing and retrieving vast amounts of data. This ability to manage massive amounts of information has become a virtual necessity in business today.

Usually, the process of obtaining information from the DBMS is highly interactive, requiring short periods of high bandwidth, low-latency communications between the end user and the DBMS, followed by extended periods with little or no communications traffic. Because local area network (LAN) or wide area network (WAN) communications are high bandwidth and low cost, the user is typically provided access to the database via a desktop computer coupled directly by a (LAN) or a laptop computer coupled to the LAN via the Public Switched Telephone Network (PSTN). This arrangement is the well known client-server architecture.

Businesses using integrated database management systems (DBMSs) have become increasingly mobile and service-oriented, raising the need for timely and inexpensive mobile access to database information. Mobile users also frequently require access to information which is stored in different DMBSs. Mobile communications are available through cellular telephone, paging, and other radio networks, but using these communication links for providing access to DBMSs is problematic. Cellular telephone communications offer low bandwidth, are quite expensive, and often unreliable. Remote paging networks provide inexpensive reliable communications, but at the cost of low-bandwidth and high data latency. Therefore, there is a widely recognized need to provide an interface between mobile users and DBMSs using low bandwidth, high-latency mobile communication links.

A prior art solution to this problem is to implement client-agent-server (CAS) architecture, in which an agent's application is inserted between the mobile client application and the server. One example of such a system is Oracle in Motion™ produced by the Oracle Corporation. In a client-agent-server architecture, clients communicate with the agent via mobile communications link, causing the agent to execute work on behalf of the client. The results of the agent's work is bundled into a single message and transmitted back to the client application where the results are displayed. By providing an asynchronous link, the shortcomings of the mobile link are reduced.

These prior art CAS architectures use a system-level approach to accomplish this task, using the combination of many components distributed throughout the network, including the mobile user and the database server. While these prior art systems reduce use of the mobile link by sending the results in a single message, this simple communication scheme is inadequate when dealing with a broad range of mobile users and database resources, and does not take advantage of the additional information available to the query agent to fully optimize communications.

SUMMARY OF THE INVENTION

To overcome the limitations in the prior art described above and to overcome other limitations that will become apparent upon reading and understanding the present specification, the present invention discloses a method, apparatus, and article of manufacture for providing access to a database management system to a remote user.

Unlike prior art systems, the present invention interprets and optimizes processing requests and provides for different receiving mechanisms. This is accomplished by implementing one or more optimization techniques, a token to capture common information, and through results caching. The present invention also describes the use of a daemon and triggering mechanism to receive results.

The invention comprises the steps or elements of receiving a request from the remote user at an agent, interpreting the request, transforming the interpreted request into database management system commands at the agent, optionally processing the request to optimize the database management system commands, transmitting the database management system commands to the database management system, receiving a result from the database management system at the agent in response to database management system commands, transforming the result into a response message, and transmitting the response message from the agent to the remote user.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1. System Architecture

Figure 1:
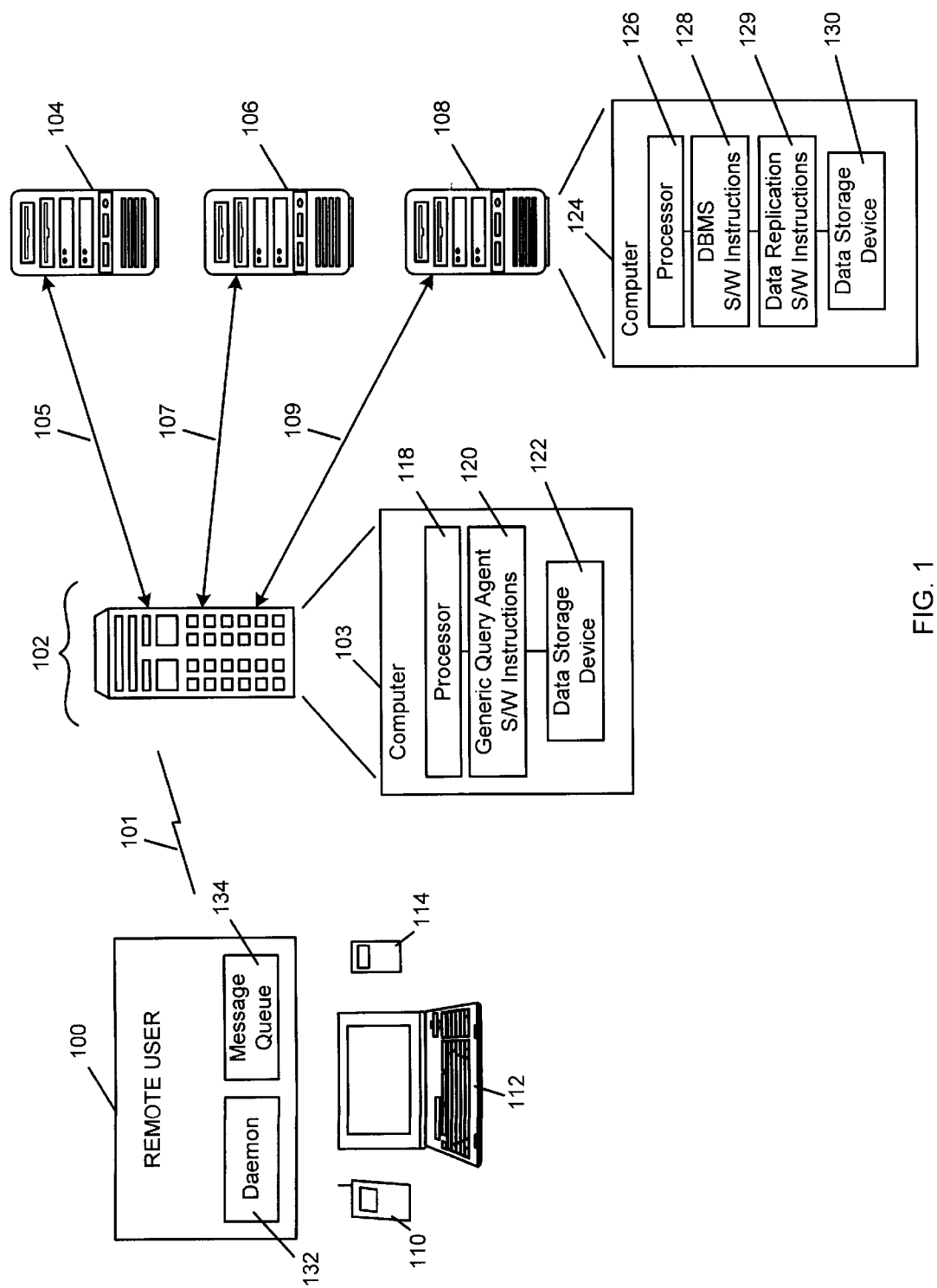
FIG. 1 is an architectural block diagram of the system.

FIG. 1 is a diagram illustrating the overall architecture and showing an exemplary hardware environment of the present invention. A remote user 100 communicates with the generic query agent 102 via a mobile link 101. These communications may be implemented with a personal data assistant (PDA) 110, a notebook or laptop computer 112 or a paging device 114. The generic query agent 102 communicates with one or more database management systems (DBMSs) 104, 106, and 108 via communication links 105, 107, and 109 respectively, to transmit database management system commands and receive results in response to the database management system commands, which are eventually transmitted to the remote user 100 via the mobile link 101.

FIG. 1 also shows a typical implementation of the present invention, where the generic query agent 102 is implemented in a computer 103 operating under control of an operating system. The generic query agent 102 is preferably effected by a software program 120 operating under control of the operating system. Generally, software program 120 may also be tangibly embodied in a computer-readable medium, e.g. one or more fixed and/or removable data storage devices 122. Under control of the operating system, the software program 120 may be loaded from the data storage device 122 into the computer memory. The software program 120 comprises instructions which, when read and executed by the processor 118, causes the computer 103 to perform the steps necessary to execute the steps or elements of the present invention. Similarly, DBMSs 104, 106, and 108 are also typically implemented by a DBMS computer 124 comprising a processor 126, a DBMS software program 128, data replication software instructions 129, and one or more fixed or removable data storage devices 130.

Those skilled in the art will recognize that the exemplary environment illustrated in FIG. 1 is not intended to limit the present invention, and that alternative hardware environments may be used without departing from the scope of the present invention.

2. System Operation

Figure 2A:
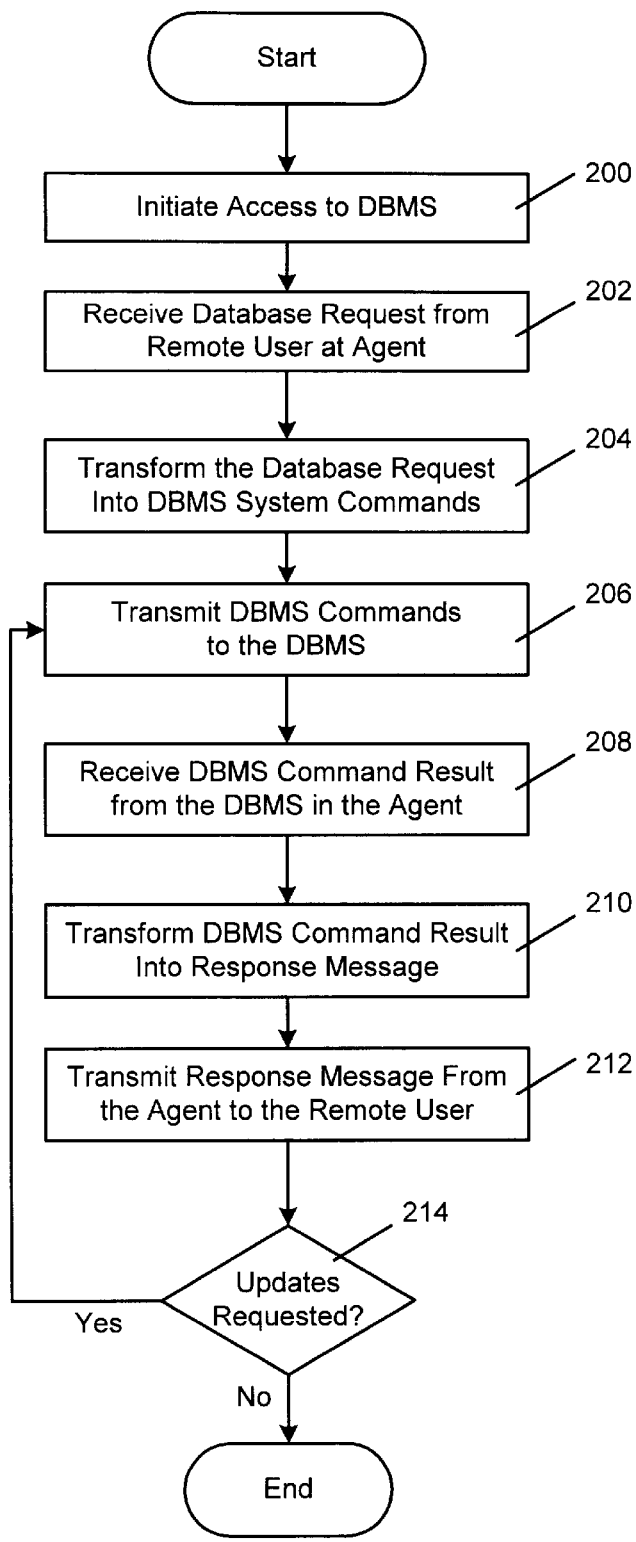
FIG. 2A is a flow chart showing the overall operation of the present invention.

FIG. 2A is a flow chart showing the overall operation of the present invention. Block 200 represents the remote user 100 initiating access between the remote user 100 and the DBMS 108. After access to the DBMS 108 is established, block 202 illustrates the generic query agent 102 receiving a request, such as a database request from the remote user 100 at the generic query agent 102. Block 204 shows the generic query agent 102 transforming the request into the DBMS 108 commands. Block 206 shows the generic query agent 102 transmitting the DBMS commands from the generic query agent 102 to the DBMS 108. In block 208, the generic query agent 102 receives the results from the DBMS 108 at the generic query agent 102 in response to the DBMS commands. In block 210, the generic query agent 102 transforms the results into a response message. Block 212 shows the generic query agent transmitting the response message from the generic query agent 102 to the remote user 100. Block 214 returns the operation flow to block 206 if updated response messages are requested.

Figure 2B:
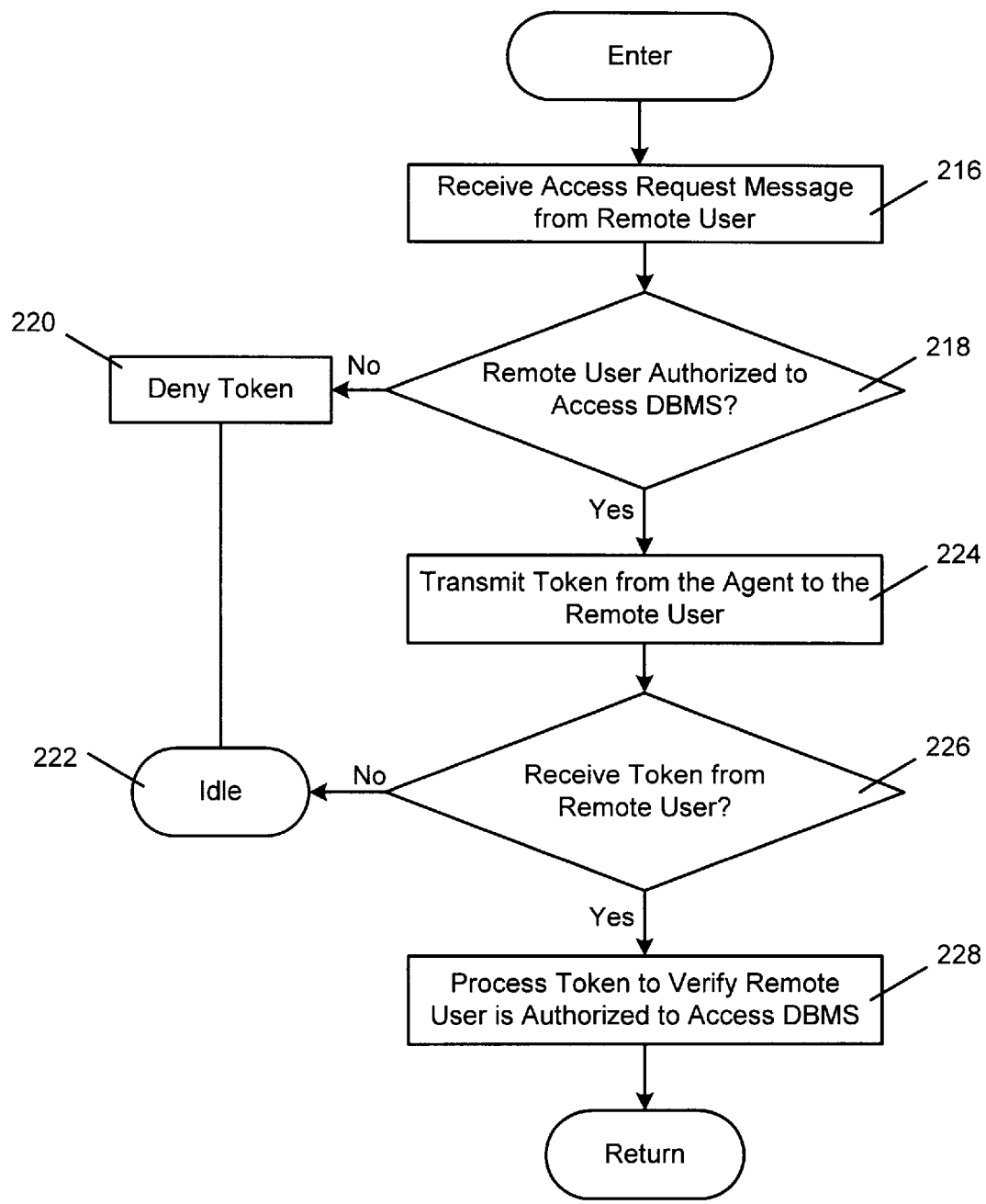
FIG. 2B is a flow chart showing the operations performed to initiate access to the database management system.

FIG. 2B illustrates the operations performed to initiate access to the DBMS 108. In block 216 the generic query agent 102 receives an access request message from the remote user 100. In block 218, the generic query agent 102 determines whether the remote user 100 is authorized to access the DBMS 108. If the remote user 100 is not authorized to access the DBMS 108, the generic query agent 102 denies remote user 110 a token as illustrated in block 220. Generic query agent 102 processing thereafter returns to an idle state 222. If the remote user 100 is authorized to access the DBMS 108, the generic query agent 102 transmits a token from the generic query agent 102 to the remote user 100, as shown in block 224. In block 226, the generic query agent 102 determines whether a token was received by the generic query agent 102 from the remote user 100. If a token was not received, the generic query agent 102 enters the idle state 222. If a token was received from the remote user 100, the generic query agent 102 processes the token to verify that the remote user 100 is authorized to access DBMS 108, as shown in block 228. In one embodiment, the token granted to the remote user 100 has a pre-specified life, after which it can no longer be used by the remote user 100 to access the DBMS 108. In another embodiment, the life of the token is determined from current or past requests from the remote user 100. For example, if the remote user request requires lengthy DBMS 108 processing, or if mobile link 101 availability is known by the generic query agent 102 to be intermittent or otherwise compromised, the generic query agent 102 grants a token to the remote user 100 with a longer life. By selecting token life based upon parameters supplied by the remote user 100, parameters known by the generic query agent 102 such as the availability of the mobile link 101 or the complexity of the DBMS 108 request, or the prior request history of the remote user 100, the generic query agent 102 may optimize the token life and minimize mobile link 101 communications.

Figure 2C:
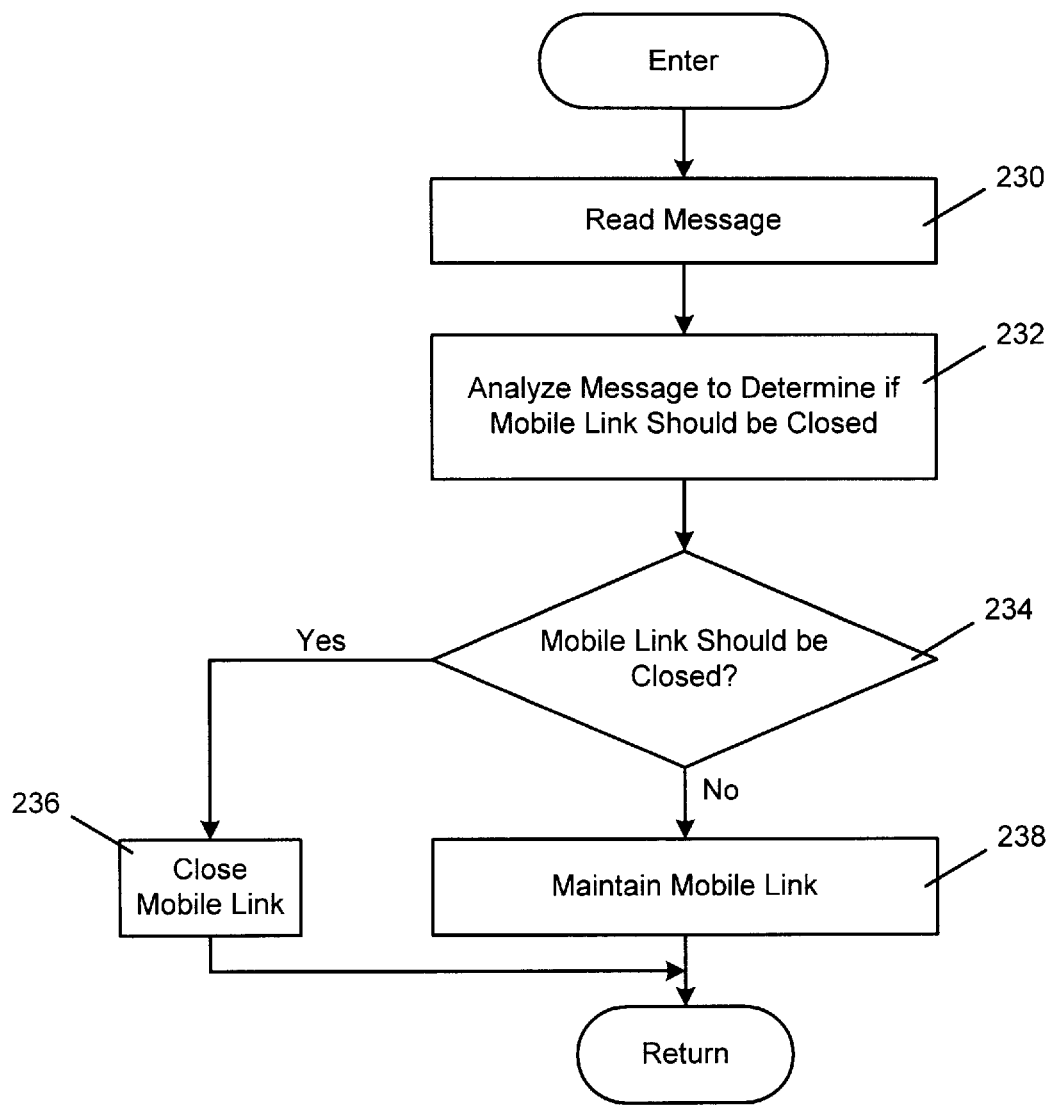
FIG. 2C is a flow chart showing the operations performed to receive the request from the remote user at the agent.

FIG. 2C shows the operations performed to receive a request from remote user 100 at the generic query agent 102. In block 230, the generic query agent 102 reads the DBMS 108 request. Block 232 illustrates the generic query agent 102 analyzing the DBMS 108 request to determine if mobile link 101 should be closed. If the mobile link should be closed 234, the generic query agent 102 causes the generic query agent 102 to close the mobile link 101, as shown in block 236. If the mobile link 101 should remain open, block 238 maintains the mobile link 101. It should be noted that in addition to the DBMS 108 request other parameters known by the generic query agent 102 can be used to determine whether the mobile link 101 should be closed or remain open. For example, the prior history of requests from the mobile user to the database 108, or the historical availability of the mobile link 101 at the time the results from the DBMS 108 will be available may be considered in the determination as to whether the mobile link 101 be maintained or closed. Similarly, other parameters may be used to make this determination.

Many different strategies can be employed to implement message trafficking between the remote user 100 and the generic query agent 102. For example, in one embodiment, a daemon 132 is invoked at the remote user 100 whenever required. The generic query agent 102 will either wait for a connection request from the daemon 132 or periodically contact the daemon 132 proactively. Once communications are established, the query result will be sent to and stored at the remote user, and the daemon will notify the person making the request of the query result. Message trafficking may also be implemented using a structured messaging system such as the MQ Series, developed by IBM. In this case, message queues 134 are defined in the remote user 100 and the generic query agent 102. A trigger is associated with the message queue 134 at the remote user 100. This trigger notifies the remote user 100 to invoke a query browser to display the query result once the result enters the message queue 134. Of course, in accordance with well known techniques, the remote user 100 can request that all mobile link 101 communications be suitably encrypted.

Figure 2D:
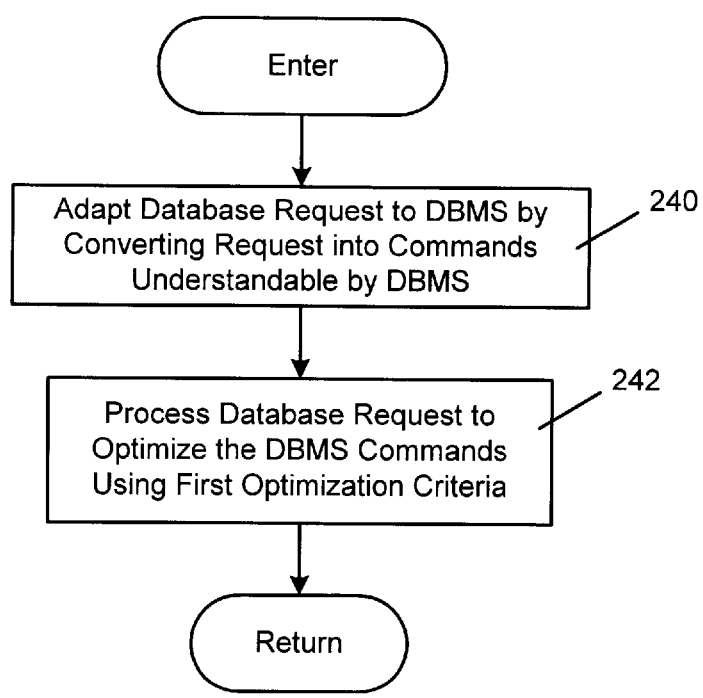
FIG. 2D is a flow chart showing the operations performed to transform the request into DBMS commands.

FIG. 2D is a flow chart showing the operations performed to transform the request from the remote user 100 into DBMS 108 commands. In block 240, the generic query agent 102 adapts the request to the DBMS 108 by converting the request into commands understandable by the DBMS 108. By performing this step, the present invention allows a wide variety of remote users 100 to communicate with a variety of DBMS 108 systems, without requiring special application software either at the remote user 100 or the DBMS 108, thereby providing a truly generic query agent 102. Block 242 illustrates the generic query agent 102 processing the request from the remote user 100 to optimize DBMS 108 commands using a first optimization criteria. This criteria may be supplied from the remote user 100 via the mobile link 101 along with the request, may be resident in the generic query agent 102, or any combination of both of these options. Optimization criteria may include information regarding available communication channels or selected communication hierarchies other than first-come first-served.

Figure 2E:
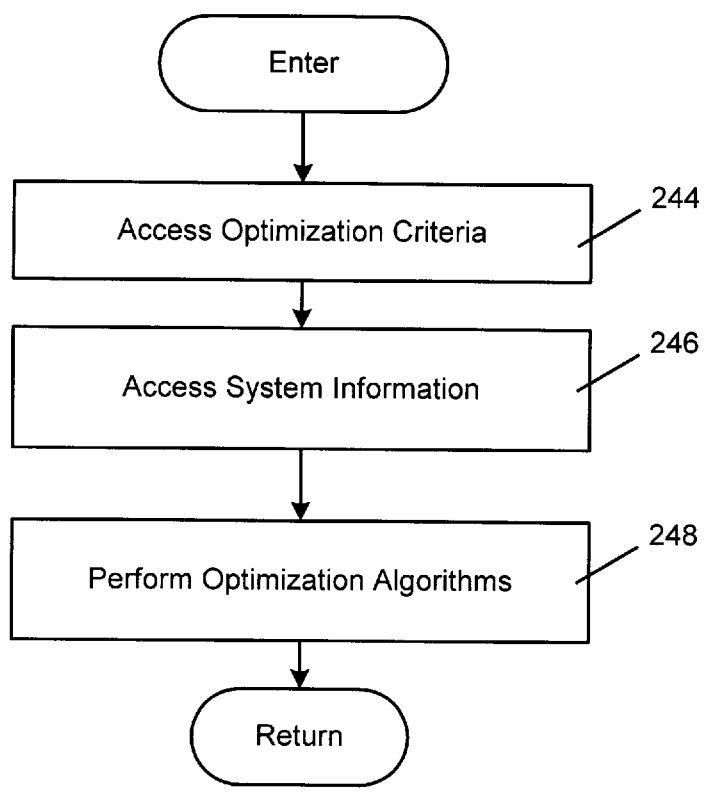
FIG. 2E is a flow chart showing the operations performed to process the request to optimize the DBMS commands.

FIG. 2E is a flow chart showing the operations performed to process the request from the remote user 100 to optimize the DBMS 108 commands using the first optimization criteria. In block 244, the generic query agent 102 accesses the optimization criteria. This information could have been sent with the request from the remote user 100, or stored in the generic query agent 102. In block 246, the generic query agent 102 accesses system information required to perform the optimization process, including information regarding the remote user 100, the request, the mobile link 101, generic query agent 102, to DBMS communication links 105–109, and DBMSs 104–108. The generic query agent 102 performs optimization algorithms to optimize the request in block 248. The algorithms used to perform this processing are well known in the art. After this processing, the request is transmitted to the indicated DBMSs 104–108 via communication links 105–109. Thereafter, the generic query agent 102 receives the results from the DBMS 108 in response to the DBMS commands.

Figure 2F:
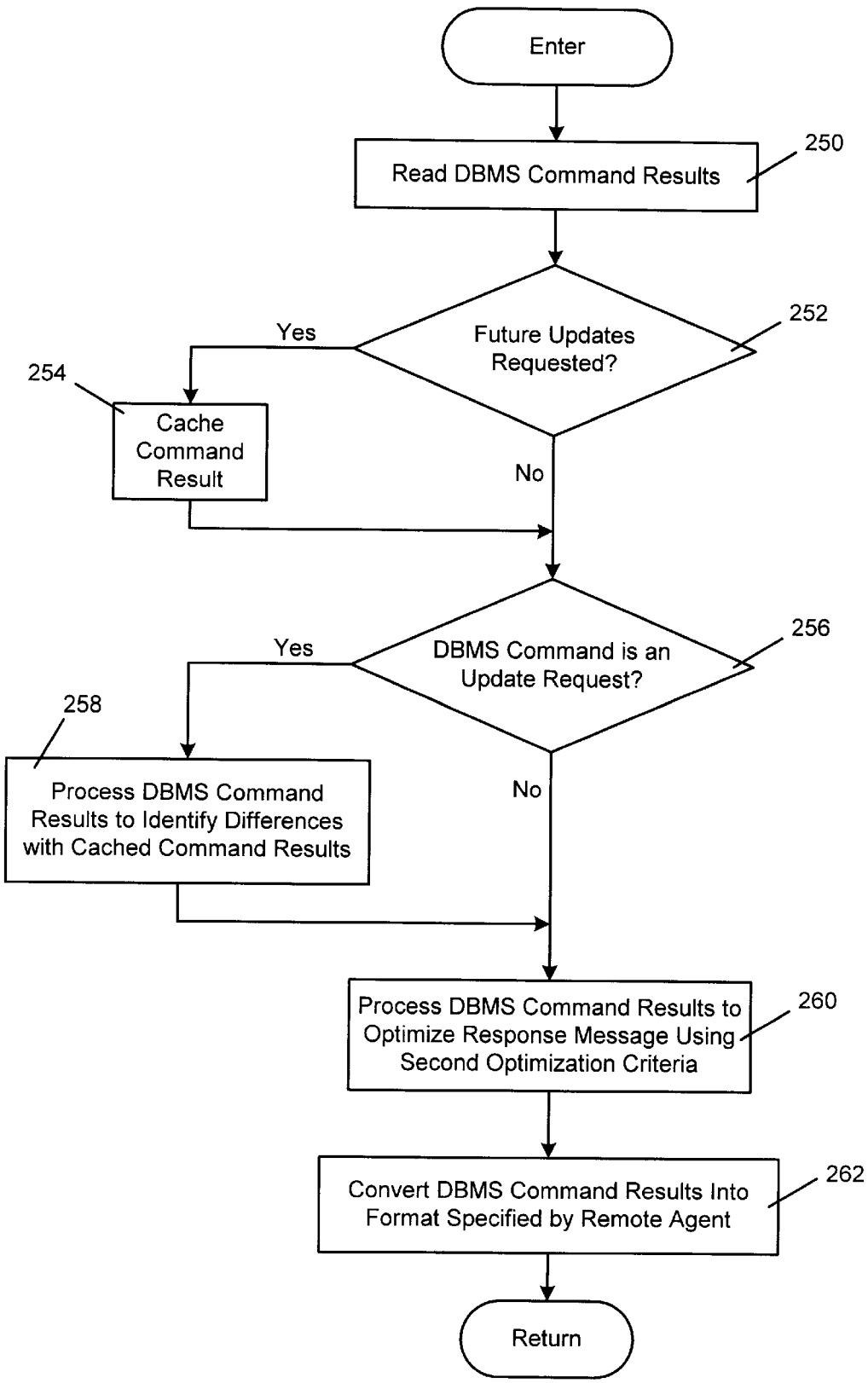
FIG. 2F is a flow chart showing the operations performed to transform the results from the DBMS commands into a response message.

FIG. 2F is a flow chart showing the operations performed to transform the results into a response message. In block 250, the generic query agent 102 reads the results, and in block 252 determines if future updates were requested by the remote user 100. These future updates could be automatic, and based on a change in the data in the DBMS 108, requested over specific intervals of time, or requested through an identical DBMS command from the remote user 100. If future updates are requested, the generic query agent caches the result for future use, as shown in block 254. In block 256, the generic query agent 102 determines if the current DBMS 108 command is an update request. If so, block 258 processes the results to identify differences with cached results. As shown in block 260, the generic query agent 102 processes the results to optimize the response message using a second optimization criteria. The processes thereby performed are analogous to those illustrated in FIG. 2E. That is, a second optimization criteria is accessed, system information required to implement the optimization criteria is accessed, and optimization algorithms are performed on the system information in the second optimization criteria. Next, as shown in block 262, the generic query agent 102 converts the results into a format suitable for the remote agent 100. This format may be specified by the remote user 100 as a part of the request, or may be stored in the generic query agent 102.

Figure 2G:
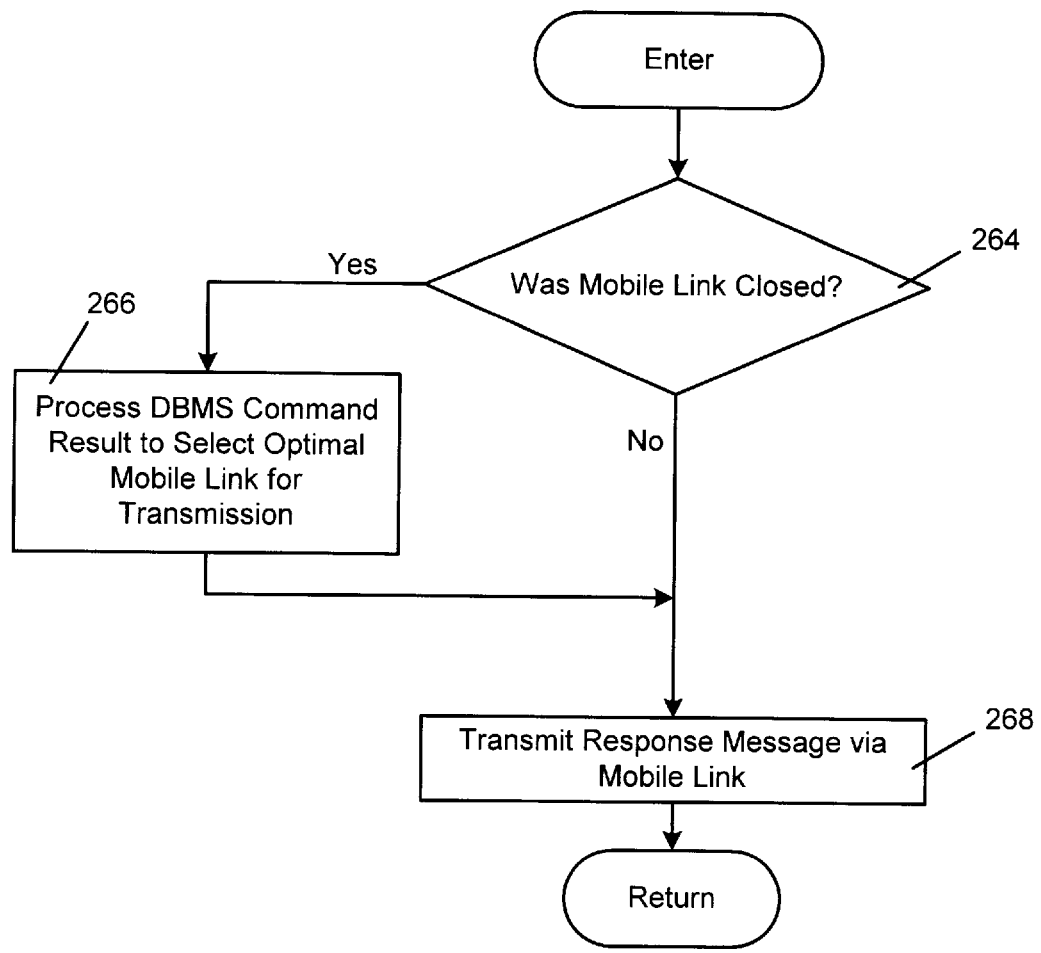
FIG. 2G is a flow chart showing the operations performed to transmit the response message from the agent to the remote user.

FIG. 2G shows the operations performed to transmit the response message from the generic query agent 102 to remote user 100. In block 264, the generic query agent 102 determines if the mobile link was closed. If so, the generic query agent 102 processes the result to select the optimal remote link for response message transmission, as shown in block 266. Thereafter, as shown in block 268, the generic query agent 102 transmits the response message from the generic query agent 102 to the remote user 100 via the selected mobile link 101.

CONCLUSION

This concludes the description of the preferred embodiment of the present invention. In summary, the present invention discloses a method and apparatus for providing access to a database management system to a remote user. The method comprises the steps of receiving a request from the remote user at an agent, transforming the request in the database management system commands at the agent by processing the request to optimize the database system commands, transmitting the database management system commands to the database management system, receiving a result from the database management system at the agent in response to the database management system commands, transforming the result into a response message, and transmitting the response message from the agent to the remote user.

The foregoing description of the preferred embodiment of the invention have been presented for purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of providing access to data stored at a database management system implemented by a server computer to a remote user operating a client computer, connected by a communications channel, comprising the steps of:

receiving a request from the client computer at an agent executed by an agent computer;

interpreting the request at the agent;

assigning a dynamically determined lifetime to a token;

communicating the token to the client computer;

determining whether to close the communications channel;

when it is determined that the communications channel is to be closed, closing the communications channel;

transforming the interpreted request into database management system commands at the agent;

transmitting the database management system commands to the database management system;

receiving a result from the database management system at the agent in response to the database management system commands;

transforming the result into a response message at the agent;

when the communications channel has been closed, re-opening the communications channel;

communicating the token from the client to the server;

verifying that the lifetime of the token has not expired; and transmitting the response message from the agent to the client computer.

2. The method of claim 1, wherein the step of transforming the interpreted request comprises the step of processing the request to optimize the database management system commands according to a first optimization criteria.

3. The method of claim 2, wherein the database management system commands are optimized to reduce message traffic between the client computer and the agent.

4. The method of claim 2 wherein the request comprises the first optimization criteria.

5. The method of claim 2 wherein the first optimization criteria is stored in the agent.

6. The method of claim 2 further comprising the step of processing the result to optimize the response message according to a second optimization criteria.

7. The method of claim 6, wherein the response message is optimized to reduce message traffic between the client computer and the agent.

8. The method of claim 6, wherein the request comprises the second optimization criteria.

9. The method of claim 6, wherein the second optimization criteria is stored in the agent.

10. The method of claim 1, wherein the step of transforming the request into database management commands further comprises the step of translating the request into a format adapted to the database management system.

11. The method of claim 1, wherein the step of transforming the result into a response message comprises the step of converting the result into a format specified by the remote user at the agent.

12. The method of claim 1, wherein the request comprises an access token, and the method further comprising the steps of:
   receiving an access request message from the client computer at the agent;
   transmitting the token from the agent to the client computer when the remote user is authorized to access the database management system;
   receiving the token from the client computer at the agent; and
   processing the token to verify that the remote user is authorized to access the database management system.

13. The method of claim 12, wherein the token is transmitted from the client computer to the agent with the request.

14. The method of claim 1, wherein the lifetime of the token is determined from the request.

15. The method of claim 1, wherein the result comprises a first result and a second result, and the response message comprises a first response message and a second response message, and the method further comprises the steps of:
   caching the first result in the agent; and
   optimizing the second response message in the agent by including only information contained in the second result, but not present in the cache of the first result.

16. The method of claim 1 wherein the request and response message are communicated between the client computer and the agent via a daemon invoked at the client computer.

17. The method of claim 16 further comprising the step of periodically querying the daemon to determine if any requests are present.

18. The method of claim 1 wherein the client computer further comprises a first message queue associated with a trigger and a query browser to display the response message, the agent further comprises a second message queue, and the step of transmitting the response message to from the agent to the user comprises the steps of sending a message to the client computer to activate the trigger to invoke the query browser at the client computer.

19. The method of claim 1, wherein the lifetime of the token is determined from a history of transactions with the client.

20. The method of claim 1, wherein the lifetime of the token is determined from characteristics of the communications channel.

21. The method of claim 1, further comprising the step of selecting an optimal channel to use to re-open the communications channel.

22. An apparatus for providing access to data stored at a database management system implemented by a server computer to a remote user operating a client computer, connected by a communications channel, comprising:
   an agent computer having a processor, a memory and a data storage device;
   means, performed by the agent computer, for receiving a request from the client computer at the agent computer;
   means, performed by the agent computer, for interpreting the request;
   means, performed by the agent computer, for assigning a dynamically determined lifetime to a token;
   means, performed by the agent computer, for communicating the token to the client computer;
   means, performed by the agent computer, for determining whether to close the communications channel;
   means, performed by the agent computer, for closing the communications channel, when it is determined that the communications channel is to be closed;
   means, performed by the agent computer, for transforming the interpreted request into database management system commands at the agent;
   means, performed by the agent computer, for transmitting the database management system commands to the database management system;
   means, performed by the agent computer, for receiving a result from the database management system in response to the database management system commands;
   means, performed by the agent computer, for transforming the result into a response message;
   means, performed by the agent computer, for re-opening the communications channel, when the communications channel has been closed;
   means, performed by the agent computer, for communicating the token from the client to the server;
   means, performed by the agent computer, for verifying that the lifetime of the token has not expired; and
   means, performed by the agent computer, for transmitting the response message to the client computer.

23. The apparatus of claim 22, further comprising means for processing the request to optimize the database management system commands according to a first optimization criteria.

24. The apparatus of claim 23 further comprising means for optimizing the database management system commands to reduce message traffic between the client computer and the agent.

25. The apparatus of claim 23, wherein the request comprises the first optimization criteria.

26. The apparatus of claim 23, wherein first optimization criteria is stored in the agent.

27. The apparatus of claim 23, further comprising means for processing the result to optimize the response message according to a second optimization criteria.

28. The apparatus of claim 27, further comprising means for optimizing the response message to reduce message traffic between the client computer and the agent.

29. The apparatus of claim 27, wherein the request comprises the second optimization criteria.

30. The apparatus of claim 27, further comprising means for storing the second optimization criteria in the agent.

31. The apparatus of claim 22, wherein the means for transforming the request into database management commands further comprises means for translating the request into a format adapted to the database management system.

32. The apparatus of claim 22, wherein the means for transforming the result into a response message further comprises means for converting the result into a format specified by the remote user at the agent.

33. The apparatus of claim 22, wherein the request comprises an access token, and the apparatus further comprises means for:

receiving an access request message from the client computer at the agent;

transmitting the token from the agent to the client computer when the remote user is authorized to access the database management system;

receiving the token from the client computer at the agent; and processing the token to verify that the remote user is authorized to access the database management system.

34. The apparatus of claim 33, further comprising the means for transmitting the token from the client computer to the agent with the request.

35. The apparatus of claim 22, further comprising the means for determining the lifetime of the token from the request.

36. The apparatus of claim 22, wherein the result comprises a first result and a second result, and the response message comprises a first response message and a second response message, and the apparatus further comprises the means for:

caching the first result in the agent; and optimizing the second response message in the agent by including only information contained in the second result, but not present in the cache of the first result.

37. The apparatus of claim 22, further comprising a daemon invoked at the client computer to communicate the request and response message between the client computer and the agent.

38. The apparatus of claim 37, further comprising means for periodically querying the daemon to determine if any requests are present.

39. The apparatus of claim 22, wherein the client computer further comprises a first message queue associated with a trigger and a query browser to display the response message, the agent further comprises a second message queue, and the means for transmitting the response message from the agent to the user further comprises a means for sending a message to the client computer to activate the trigger to invoke the query browser at the client computer.

40. The apparatus of claim 22, further comprising means for determining the lifetime of the token from a history of transactions with the client.

41. The apparatus of claim 22, further comprising means for determining the lifetime of the token from characteristics of the communications channel.

42. The apparatus of claim 22, further comprising means for selecting an optimal channel to use to re-open the communications channel.

43. A program storage device, readable by an agent computer having a processor, a memory, and a data storage device, tangibly embodying one or more programs of instructions executable by the agent computer to perform method steps of providing access to data stored at a database management system implemented by a server computer to a remote user operating a client computer, connected by a communications channel, the method comprising the steps of:

receiving a request from the client computer at an agent executed by the agent computer;

interpreting the request from the client computer;

assigning a dynamically determined lifetime to a token;

communicating the token to the client computer;

determining whether to close the communications channel;

when it is determined that the communications channel is to be closed, closing the communications channel;

transforming the interpreted request into database management system commands at the agent;

transmitting the database management system commands to the database management system;

receiving a result from the database management system at the agent in response to the database management system commands;

transforming the result into a response message at the agent;

when the communications channel has been closed, re-opening the communications channel;

communicating the token from the client to the server;

verifying that the lifetime of the token has not expired; and transmitting the response message from the agent to the client computer.

44. The program storage device of claim 43, wherein the method steps further comprise the step of processing the request to optimize the database management system commands according to a first optimization criteria.

45. The program storage device of claim 44, wherein the method steps further comprise the step of optimizing the database management system commands to reduce message traffic between the client computer and the agent.

46. The program storage device of claim 44, wherein the request comprises the first optimization criteria.

47. The program storage device of claim 44, wherein first optimization criteria is stored in the agent.

48. The program storage device of claim 44, wherein the method steps further comprise the step of processing the result to optimize the response message according to a second optimization criteria.

49. The program storage device of claim 48, wherein the method steps further comprise the step of optimizing the response message to reduce message traffic between the client computer and the agent.

50. The program storage device of claim 48, wherein the request comprises the second optimization criteria.

51. The program storage device of claim 48, wherein the second optimization criteria is stored in the agent.

52. The program storage device of claim 43, wherein the method steps further comprise the step of converting the result into a format specified by the remote user at the agent.

53. The program storage device of claim 43, wherein the method steps further comprise the step of translating the request into a format adapted to the database management system.

54. The program storage device of claim 43, wherein the request comprises an access token, and the method steps further comprise:

receiving an access request message from the client computer at the agent;

transmitting the token from the agent to the client computer when the remote user is authorized to access the database management system;

receiving the token from the client computer at the agent; and processing the token to verify that the remote user is authorized to access the database management system.

55. The program storage device of claim 54, wherein the method steps further comprise transmitting the token from the client computer to the agent with the request.

56. The program storage device of claim 43, wherein the method steps further comprise determining the lifetime of the token from the request.

57. The program storage device of claim 43, wherein the result comprises a first result and a second result, and the response message comprises a first response message and a second response message, and the method steps further comprise:

caching the first result in the agent; and optimizing the second response message in the agent by including only information contained in the second result, but not present in the cache of the first result.

58. The program storage device of claim 43, wherein the method steps further comprise invoking a daemon at the client computer to communicate the request and response message between the client computer and the agent.

59. The program storage device of claim 58, wherein the method steps further comprise periodically querying the daemon to determine if any requests are present.

60. The program storage device of claim 43, wherein the client computer further comprises a first message queue associated with a trigger and a query browser to display the response message, the agent further comprises a second message queue, and the method steps further comprise sending a message to the client computer to activate the trigger to invoke the query browser at the client computer.

61. The program storage device of claim 43, wherein the method steps further comprise determining the lifetime of the token from a history of transactions with the client.

62. The program storage device of claim 43, wherein the method steps further comprise determining the lifetime of the token from characteristics of the communications channel.

63. The program storage device of claim 43, wherein the method steps further comprise selecting an optimal channel to use to re-open the communications channel.

* * * * *

UNITED STATES PATENT AND TRADEMARK OFFICE
CERTIFICATE OF CORRECTION

PATENT NO. : 5,881,232

DATED : March 9, 1999

INVENTOR(S) : Josephine M. Cheng, HongHai Shen and Steven John Watts

It is certified that error appears in the above-identified patent and that said Letters Patent is hereby corrected as shown below:

On the title page, item [56] References Cited,

Column 2, after " 5,774,461  6/1998  Hyden et al. ..................... 370/329," insert new paragraph as follows:

--OTHER PUBLICATIONS

"Oracle in Motion, Technical Product Summary," Oracle White Paper, September 1994, Part A22547, pp. 1-9"--

Signed and Sealed this

Fourth Day of April, 2000

Q. TODD DICKINSON

*Attest:*

*Attesting Officer*        *Director of Patents and Trademarks*